United States Patent
Stepanov et al.

(10) Patent No.: US 9,460,230 B1
(45) Date of Patent: Oct. 4, 2016

(54) METHOD AND SYSTEM FOR VISUAL STYLING OF VISUAL ELEMENTS FOR APPLICATIONS

(71) Applicant: Google Inc., Mountain View, CA (US)

(72) Inventors: Maxim Stepanov, San Mateo, CA (US); Paul Colton, Palo Alto, CA (US); Kevin Lindsey, Fort Worth, TX (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/745,420

(22) Filed: Jun. 20, 2015

Related U.S. Application Data

(63) Continuation of application No. 14/199,812, filed on Mar. 6, 2014, now Pat. No. 9,063,726.

(60) Provisional application No. 61/781,001, filed on Mar. 14, 2013.

(51) Int. Cl.
  *G06F 17/30* (2006.01)
  *H04L 29/08* (2006.01)
  *G06F 9/44* (2006.01)

(52) U.S. Cl.
  CPC ... *G06F 17/30905* (2013.01); *G06F 17/30896* (2013.01); *H04L 67/02* (2013.01)

(58) Field of Classification Search
  CPC ......... G06F 8/34; G06F 9/4443; H04W 4/18
  USPC ................................................. 717/116–117
  See application file for complete search history.

(56) References Cited

U.S. PATENT DOCUMENTS

| | | | |
|---|---|---|---|
| 6,973,625 B1 | 12/2005 | Lupo et al. | |
| 7,647,564 B2 | 1/2010 | Olander et al. | |
| 7,681,178 B1 * | 3/2010 | George et al. | 717/117 |
| 7,814,423 B2 | 10/2010 | Musson et al. | |
| 7,827,481 B1 * | 11/2010 | Greenfield et al. | 715/236 |
| 8,438,577 B2 | 5/2013 | Qing et al. | |
| 8,775,926 B2 * | 7/2014 | Viet | 715/236 |
| 9,063,726 B1 | 6/2015 | Stepanov et al. | |
| 2003/0164855 A1 * | 9/2003 | Grant et al. | 345/763 |
| 2006/0095860 A1 * | 5/2006 | Wada et al. | 715/771 |
| 2013/0239085 A1 * | 9/2013 | Jaramillo et al. | 717/105 |

OTHER PUBLICATIONS

Anonymous, "Highlighting and navigation of related elements in a web authoring tool," IPCOM000221569D, Sep. 11, 2012, 5pg.*
Anonymous, "Method for defining RIA Toolkit theme integration with Theme Development Tools," Jan. 28, 2011, 7pg.*
Conzett et al., "The Front of IBM WebSphere," IBM, Jan. 2000, 202pg.*
Prosecution History from U.S. Appl. No. 14/199,812, dated May 19, 2014 through May 8, 2015, 93 pp.

* cited by examiner

*Primary Examiner* — Ryan Coyer
(74) *Attorney, Agent, or Firm* — Shumaker & Sieffert, P.A.

(57) ABSTRACT

A method and system for the dynamic extension (e.g. subclassing) of objects to enable visual styling of on-screen elements is disclosed herein. The present invention allows designers and developers alike to conceive, implement, and modify native mobile interfaces effortlessly and in real time through a familiar CSS-based syntax. The technique of dynamic subclassing for the purpose of styling greatly simplifies the development process by no longer requiring the developer to directly configure visual element's properties or to subclass objects in code.

12 Claims, 7 Drawing Sheets

METHOD AND SYSTEM FOR VISUAL STYLING OF VISUAL ELEMENTS FOR APPLICATIONS

CROSS REFERENCE TO RELATED APPLICATION

The Present application is a continuation application of U.S. patent application Ser. No. 14/199,812, filed on Mar. 6, 2014, which claims priority to U.S. Provisional Patent No. 61/781,001, filed on Mar. 14, 2013, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to stylizing of user interfaces for mobile and web applications.

2. Description of the Related Art

The prior art discusses various methods to for styling of user interfaces. The prior art solution is to either subclass the original objects (e.g. Button class), configure a user interface element via properties and attributes, or use appearance proxy objects to set properties. The prior art discloses methods that generally require developers to subclass the original class and override methods in order to present an alternate visual appearance. Proxy objects can also be used to apply styling to their corresponding object. Both of these techniques create an additional burden on the developer, and also make the code harder to maintain and less portable across platforms.

General definitions for terms utilized in the pertinent art are set forth below.

APP is a software application for a mobile phone such as a smart phone.

Applets or Java Applets are mini-executable programs named with the class suffix and are placed on the web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Cascading Style Sheets ("CSS") separates the styling of a web page from the content of the web page by styling individual HTML elements on a web page according to a predefined set of properties for each element type. CSS is a declarative language. Each CSS rule is composed of two parts: selector and declarations. The selector indicates which element a rule applies to. Declarations indicate the properties of an element to change, such as typeface, color, and the value desired, such as Ariel typeface and red color. CSS allows a programmer to specify rules for how the content of elements within a document appear on the page.

FTP or File Transfer Protocol is a protocol for moving files over the Internet from one computer to another.

GSM, Global System for Mobile Communications is a second generation digital cellular network.

HTML (Hypertext Markup Language) is the language that describes the structure and the semantic content of a Web document. HTML is designed to specify the logical organization of text documents.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

"PX" is the name used herein for the application of the present invention.

"PX Engine" is the name used herein for the engine of the present invention.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others. VML (Vector Markup Language) supports the markup of vector graphic information in the same way that HTML supports the markup of textual information. VML is written using the syntax of XML.

WAP Push is defined as an encoded WAP content message delivered (pushed) to a mobile communication device which includes a link to a WAP address.

XML (Extensible Markup Language) is a meta markup language, for creating special-purpose markup languages. It is a simplified subset of SGML, capable of describing many different kinds of data. Its primary purpose is to facilitate the sharing of data across different systems, particularly systems connected via the Internet.

The prior art has failed to provide an effective solution that does not create an additional burden on the developer, and also make the code harder to maintain and less portable across platforms.

BRIEF SUMMARY OF THE INVENTION

An implementation of this method uses Objective-C's runtime APIs to dynamically create a new subclass for the original user interface element's type. The new subclass provides static and dynamic styling and theming support for the original type.

The technique of dynamic subclassing for the purpose of styling greatly simplifies the development process by no longer requiring the developer to directly configure visual element's properties or to subclass objects in code. A declarative language, like CSS, is used to visually style the original user interface elements and the present invention dynamically creates the classes necessary to achieve to visually style the original user interface elements. Dynamically subclassing means that styling is applied to any visual element on the screen, regardless of its class hierarchy, whether or not it originates from the developer, and also means that the developer styles visual elements without altering original code or subclassing existing objects.

Developers need to understand and must implement their own custom configurations and sub-classes in order to style and theme their user interface elements. This system allows developers to style and theme their user interface elements with a declarative language such as CSS. Any user interface configuration or sub-typing needed to achieve the desired styling and theming is done automatically. This greatly simplifies the knowledge required to style a user interface, and greatly increases designer and developer productivity.

As user interface elements become part of the user interface scene graph, this system automatically augments the given element's type hierarchy, thus avoiding the need for the developer to sub-class a given type. The augmented type can also perform any configurations that are needed for styling and theming purposes. The invention uses code that automatically creates subclasses of objects that represent visual elements on the screen for the purpose of visually styling the visual elements so the developer doesn't have to manually create these subclasses or configure visual element's properties directly or indirectly via appearance proxy objects.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
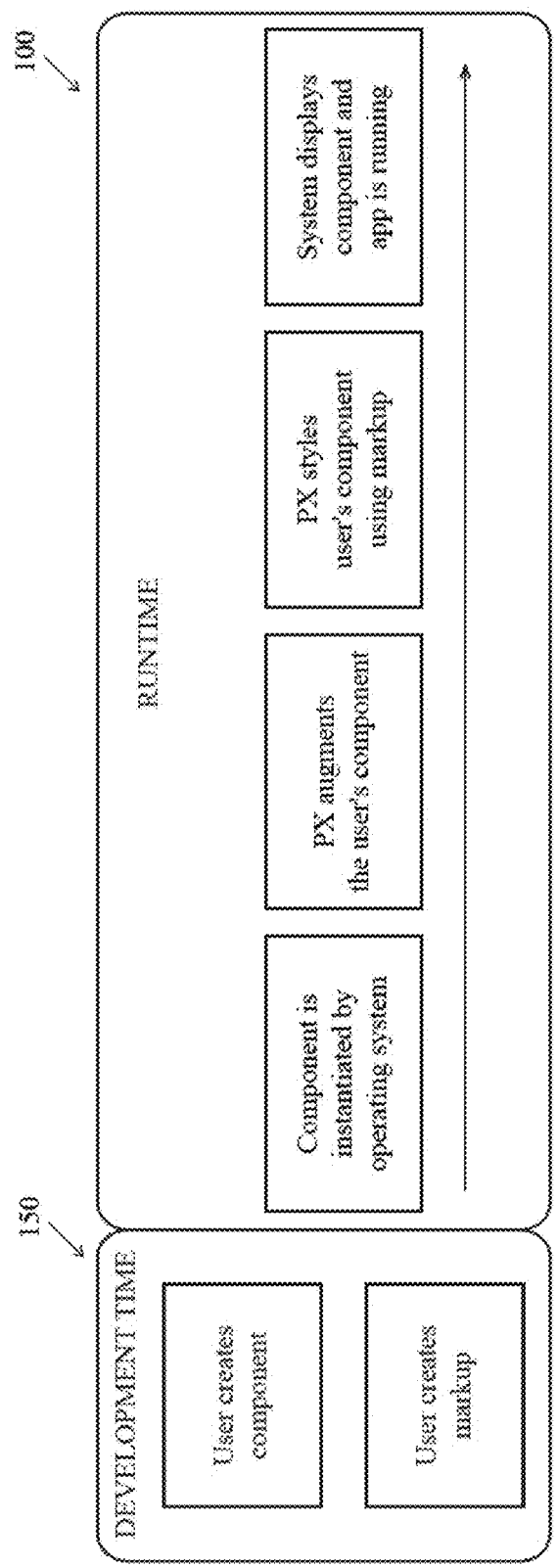
FIG. 1 is a diagram of a general method for the dynamic extension (e.g. subclassing) of objects to enable visual styling of on-screen elements.

The present invention comprises a method for the dynamic extension (e.g. subclassing) of objects to enable visual styling of on-screen elements. The method comprises the steps of: identifying a plurality of visual elements within a declarative markup (e.g. Cascading Style Sheet (CSS)) of a software application, generating a dynamic extension for each visual element of the plurality of elements, inputting methods into the dynamic extension for each visual element of the plurality of elements to manage the static and dynamic visual styling of an original object and assigning the dynamic extension for each visual element of the plurality of elements as the actual class of the object for each visual element of the plurality of elements. Preferably, the software application is a mobile software application. Alternatively, the software application is a web software application.

Another aspect of the present invention is a method for the dynamic extension (e.g. subclassing) of objects to enable static and real-time visual styling of on-screen elements for user interfaces. The method comprises: identifying a plurality of user interface elements within a declarative markup (e.g. CSS) of a software application, determining when a user interface element of the plurality of user interface elements will be displayed, determining if the user interface element requires dynamic extending and generating a dynamic class as a subclass of a type of the user interface element and applying a new class structure to the user interface element. Preferably, the software application is a mobile software application. Alternatively, the software application is a web software application.

Yet another aspect of the present invention is a system for the dynamic extension (e.g. subclassing) of objects to enable static and real-time visual styling of on-screen elements for user interfaces. The system comprises a software application comprising a declarative markup (e.g. CSS) with a plurality of user interface elements. The system further comprises a styling engine configured to identify the plurality of user interface elements within a declarative markup of a software application, determine when a user interface element of the plurality of user interface elements will be displayed, determine if the user interface element requires dynamic class extensions, generate a dynamic class as a subclass of a type of the user interface element, and apply a new class structure to the user interface element. Preferably, the software application is a mobile software application. Alternatively, the software application is a web software application.

Dynamically subclassing means that styling is applied to any visual element on the screen, regardless of its class hierarchy, whether or not it originates from the developer, and also means that the developer styles visual elements without altering original code or subclassing existing objects.

A new class is dynamically created, methods are copied into this new class that will manage the static and dynamic visual styling of the original object and then the new class is assigned as the base class of the object. This is done at runtime and in real-time, including real-time updating of the visual style.

The inputs of the present invention comprise creating a new subclass of visual element's class at runtime, thus the subclass becomes the actual class of the existing visual element. Methods from the styling proxy are copied into this new class. These methods facilitate the visual styling of the original object. Copying additional or override existing methods from styling stub class into the new subclass methods facilitate both static and real-time styling of the original visual element. Live updating of the styling results in applying updated styles to dynamically created classes.

The present invention detects when a user interface element is going to be displayed to allow the method to style the element before being displayed. The next step is to determine if the element needs dynamic subclassing, wherein some elements may not need styling or they may not be style-able and this distinction is made. A dynamic class as a sub-class of the user interface element's type is generated, which allows the user interface element to be styled in the same fashion as a user-defined subclass; however, this is done without developer intervention. A new class structure is applied to the user interface element, which performs the actual styling. Preferably, Styling Markup or any text-based language is used to select and describe the styling of a specific instance or class of user interface elements, which styles and themes user interface elements. User interface element instances at runtime, with their theme and styling applied to them.

The present invention allows designers and developers alike to conceive, implement, and modify native mobile interfaces effortlessly and in real time through a familiar CSS-based syntax. As set forth herein, the app of the present invention is referenced as "PX".

FIG. 1 illustrates a development time 150, also known as compile time, and runtime 100. Development time is a phase of a program's lifecycle, source code is developed within programming language requirements, and by example of the present invention, a time wherein a user creates a component and creates markup, e.g., a CSS file. Runtime 100 is the time when a program is executed, and by example of the present invention, a few steps are illustrated. A component is instantiated at runtime by an operating system of a mobile device. The engine of the present invention, herein referenced as "PX Engine", augments the user's components. The PX Engine styles the user's component using markup. Then, the system displays the component and the mobile app is running.

The iPHONE® mobile phone from Apple, Inc., of Cupertino, Calif. has an iOS platform. An app developer wishing to develop a mobile application for an iPHONE® mobile phone must create the mobile application using an iOS platform. The app developer will need XCODE development toolset and iOS SDK, and the app developer will work with the Cocoa and Cocoa Touch frameworks.

If the app developer wishes to have the mobile application available for an ANDROID® phone, then the app developer must create a new mobile application using an ANDROID operating platform. The app developer will need a JAVA® development kit ("JDK"), ECLIPSE™ IDE, the ANDROID® SDK, and the ANDROID development tools plug-in.

If the app developer wishes to have the mobile application available for a WINDOWS® phone, then the app developer must create a new mobile application using a WINDOWS® operating platform. The app developer will need WINDOWS phone developer tools, and the app developer will work with the SILVERLIGHT framework or the XNA Framework of the WINDOWS® phone application platform. Also, the mobile app must be certified by Microsoft.

Figure 2:
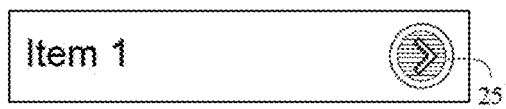
FIG. 2 is one embodiment of a style of a visual element on a graph.
Figure 2A:
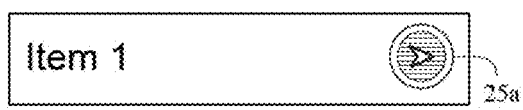
FIG. 2A is another embodiment of a style of a visual element on a graph.
Figure 2B:
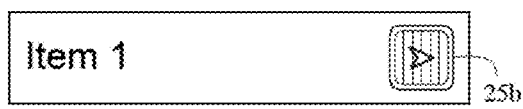
FIG. 2B is yet another embodiment of a style of visual element on a graph.
Figure 2C:
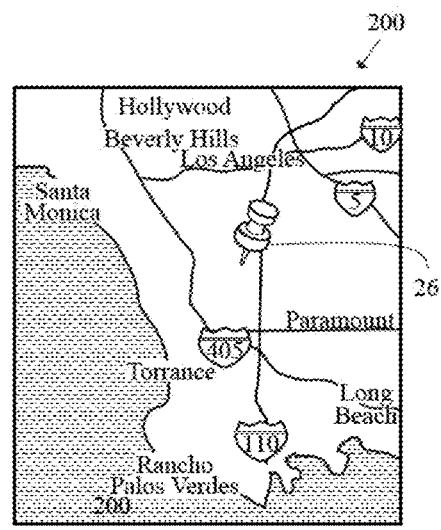
FIG. 2C is one embodiment of a style of a visual element on a graph.
Figure 2D:
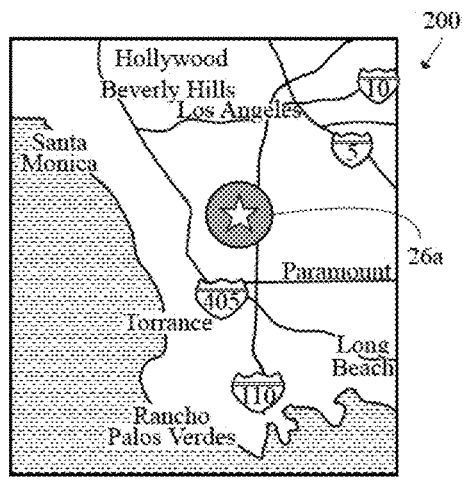
FIG. 2D is another embodiment of a style of a visual element on a graph.
Figure 2E:
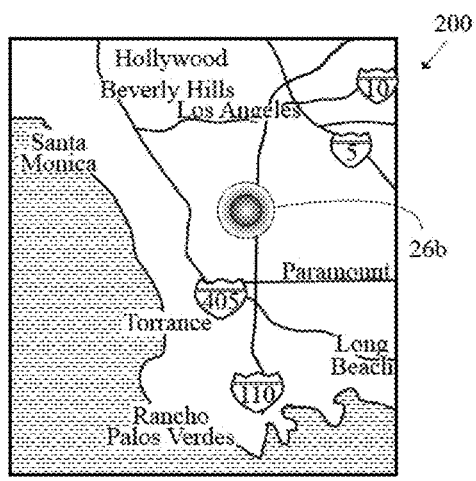
FIG. 2E is yet another embodiment of a style of visual element on a graph.

FIGS. 2-2E are examples of styling results on-screen after applying a method of the present invention. Custom disclosure buttons 26-26b created using styleId are shown in FIGS. 2-2B. An application window 200 shown in FIGS. 2C-2E illustrate a map and map pins 26-26b. The design element of the map pin is styled using styleClass.

FIGS. 2-2B illustrate how quickly and easily a custom disclosure button on a UITableView is created and styled. By default, if a disclosure button is enabled with something like the following code:
 cell.accessoryType=UITableViewCellAccessoryDetail-
  DisclosureButton;

The disclosure button 25 generated from the above code is shown in FIG. 2.

If a user wanted to create their own version of the disclosure button, in the code where the user created the cell, the following code would be written:
 UIButton*button=[[UIButton alloc] initWithFrame:
  CGRectMake (0,0,40,40)];
 [button setTitle:@"➤" forState:UIControlStateNormal];
 button.styleId=@"disclosure";
 cell.accessoryView=button;

In the code above, a special character, ➤, is used to represent the arrow. This is an example of a quick and easy way to put a custom graphic in the button, i.e., by just using a text character. Another important note is how the styleId is set on the button. This is how the PX Engine finds the button in order to style it.

Now, adding some CSS to the default.css file the user is working on will result in some styling to make it look a little like the default version of the disclosure button 25a:

```
table-view #disclosure{
    background-color: linear-gradient(#75a4e6, #2670d8);
    border-radius: 15 pt;
    border-width: 2 pt;
    border-color: white;
    size: 27 pt 27 pt;
    font-size: 16 pt;
    box-shadow: 1 pt 1 pt 1 pt #333;
}
```

The disclosure button 25a generated is shown in FIG. 2A.

Changing just a few of the CSS properties as follows will further change the look of the disclosure button 25b:

```
background-color: linear-gradient(red, pink);
border-radius: 5 pt;
```

The disclosure button 25b is shown in FIG. 2B.

FIGS. 2C-2E illustrate how to style a custom MapView pin via the AnnotationView, as an example of how it can be styled uniquely with the PX Engine. MKAnnotationViews are created much like cells are created in a UITableView, that is, they are reused if possible and otherwise created anew.

A typical MKAnnotationView might be created with the following:

```
annotationView=[[MKAnnotationView alloc] initWithAnnotation: annotation reuseIdentifier:identifier];
annotationView.enabled=YES;
annotationView.canShowCallout=YES;
annotationView.styleClass=©"myAnnotations";
```

For the case in the examples in FIGS. 2C-2E, all of the pins will be styled in the same way, so rather than using styleId, styleClass is used in order to reference any of the pins via a single CSS class name.

When using a raster graphics file format, such as a .png (portable network graphics) as the pin, the pin is specified in the CSS file as:

```
.myAnnotations {
    image: url("pin.png");
}
```

Which will generate a pin 26 as shown in FIG. 2C.

When using a scalable vector file (.svg) rather than a static bitmap, the pin is specified as:

```
.myAnnotations {
    image: url("star.svg");
    image-size: 32 pt 32 pt;
}
```

The .svg file is specified above in the same way the .png file was specified previously, however, with an addition of image-size, as shown above. Since the image is a vector file, the PX Engine needs to know how large the image should be rendered. In this case above, it is rendered at 32 by 32 points. The map pin 26a generated is shown in FIG. 2D.

Instead of using an image file, a user can create a custom background with a radial gradient from grey to none (i.e. transparent) using the following:

```
.myAnnotations {
    background-color: radial-gradient(red, none);
    background-size: 32 32;
}
```

The above code will generate a map pin 26b as shown in FIG. 2E.

Figure 3:
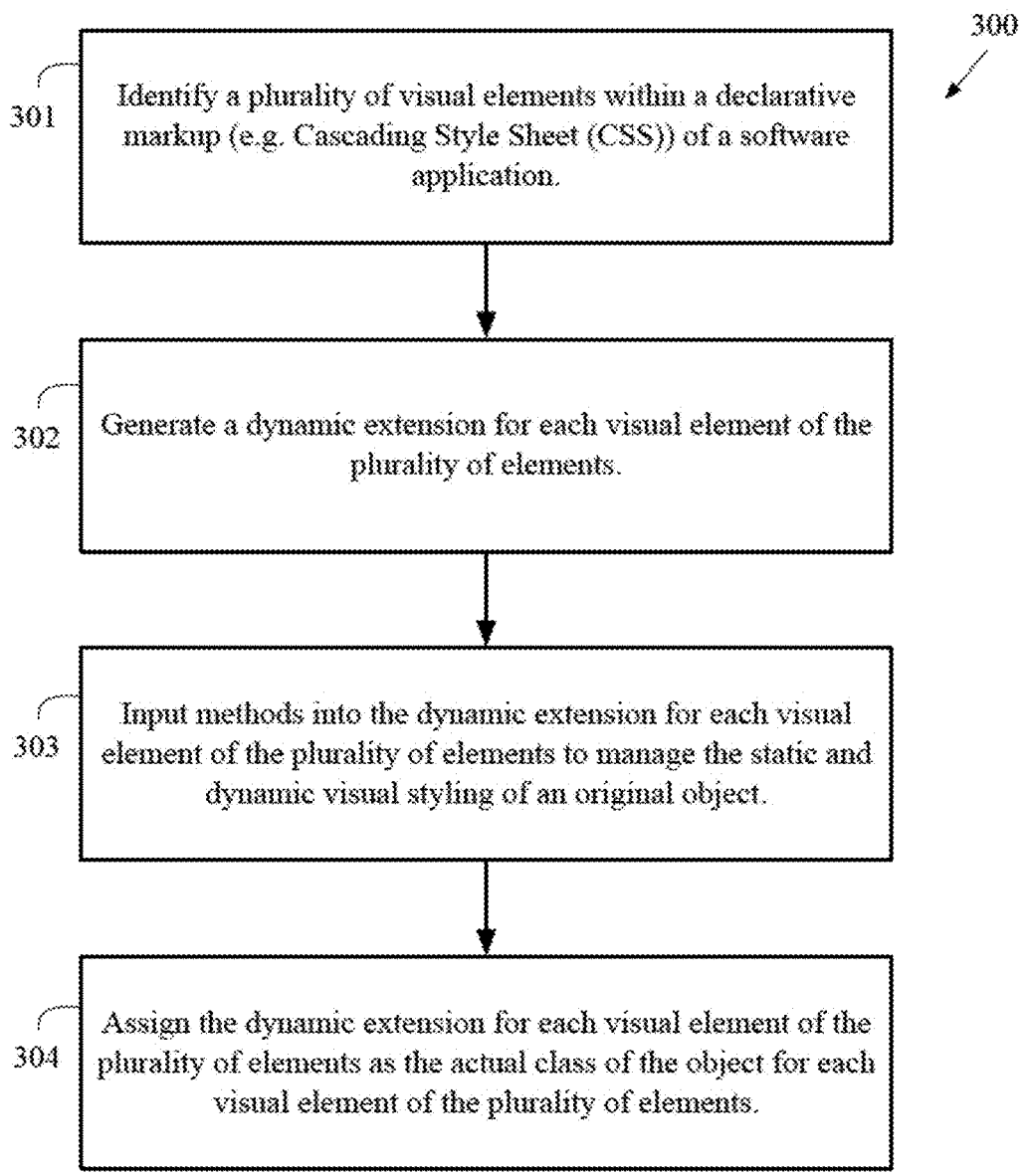
FIG. 3 is a flow chart of a general method for the dynamic extension (e.g. subclassing) of objects to enable visual styling of on-screen elements.

A flow chart for the method for the dynamic extension (e.g. subclassing) of objects to enable visual styling of on-screen elements is generally designated 300 in FIG. 3. At block 301, visual elements are identified within a declarative markup (e.g. Cascading Style Sheet (CSS)) of a software application. At block 302, a dynamic extension for each visual element of the plurality of elements is generated. At block 303, methods are inputted into the dynamic extension for each visual element of the plurality of elements to manage the static and dynamic visual styling of an original object. At block 304, the dynamic extension for each visual element of the plurality of elements is assigned as the actual class of the object for each visual element of the plurality of elements. Preferably, the software application is a mobile software application. Alternatively, the software application is a web software application.

Figure 4:
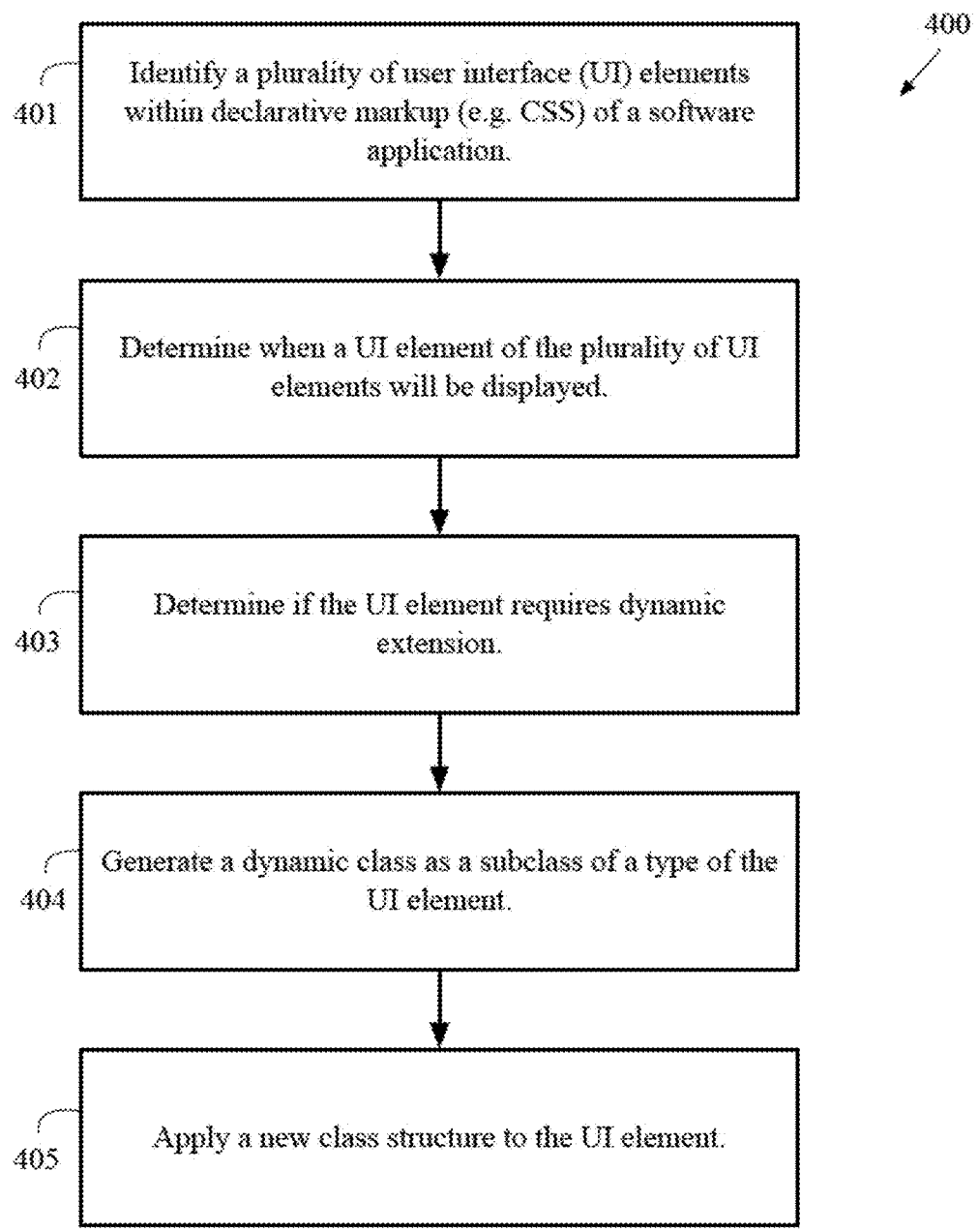
FIG. 4 is a flow chart of a general method for the dynamic extension (e.g. subclassing) of objects to enable visual styling of on-screen elements.

A flow chart for a method for method for the dynamic extension (e.g. subclassing) of objects to enable static and real-time visual styling of on-screen elements for user interfaces is generally designated 400 in FIG. 4. At block 401, user interface elements are identified within a declarative markup (e.g. CSS) of a software application. At block 402, the software engine determines when a user interface element of the plurality of user interface elements will be displayed. At block 403, the software engine determines if the user interface element requires dynamic extending. At block 404, a dynamic class is generated as a subclass of a type of the user interface element. At block 405, a new class structure is applied to the user interface element. Preferably, the software application is a mobile software application. Alternatively, the software application is a web software application.

Figure 5:
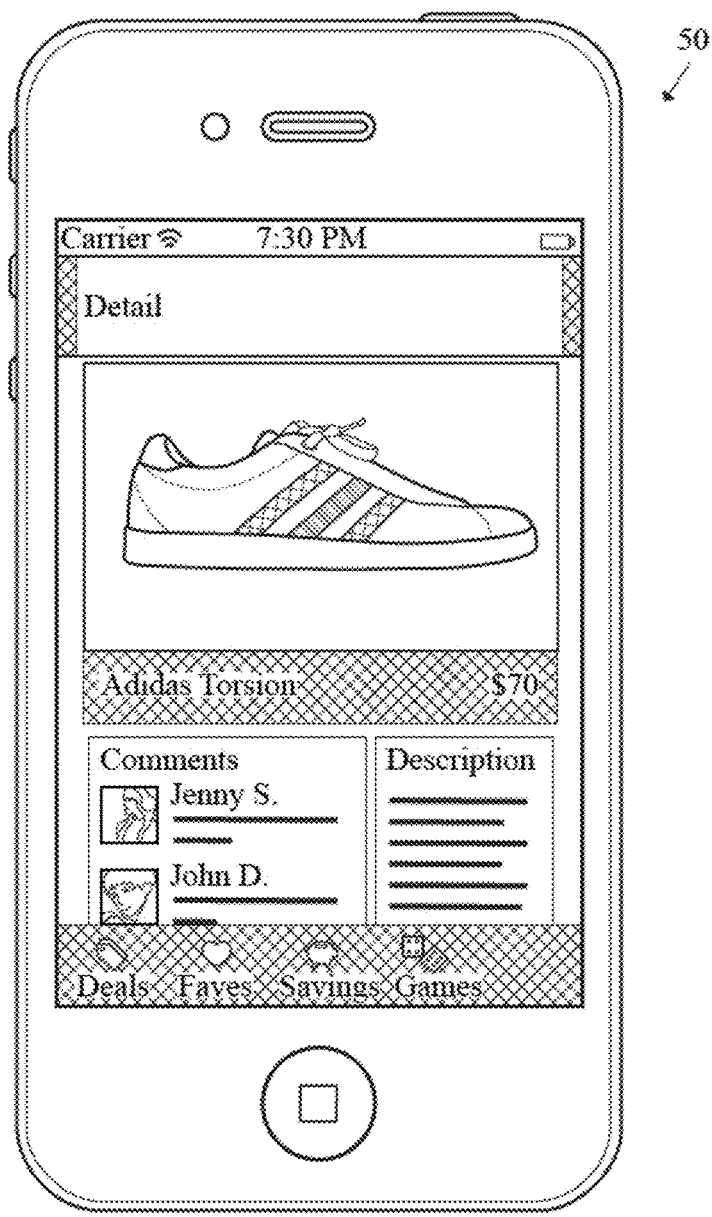
FIG. 5 is an illustration of visually styled on-screen elements.
Figure 5A:
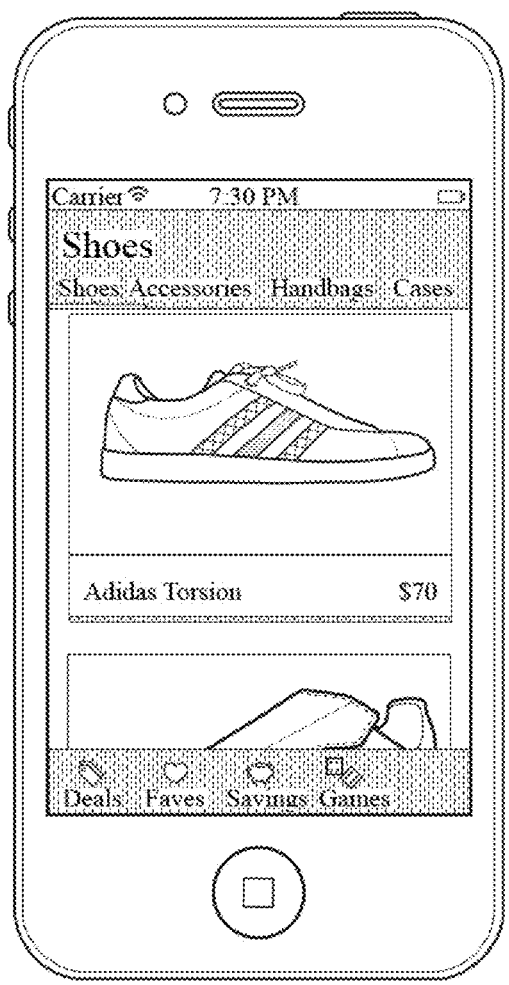
FIG. 5A is an illustration of visually styled on-screen elements.
Figure 5B:
FIG. 5B is an illustration of visually styled on-screen elements.

FIGS. 5-5B illustrate examples of visually styled elements on-screen on a mobile communication device 50.

Identifying Visual Elements

When the following PXUIWindow file is first loaded by the platform running it, in this case, an iOS device, the code on line 38 runs:

```
25    #import "PXUIWindow.h"
26
27    #import "UIView+PXStyling.h"
28    #import "UIView+PXStyling-Private.h"
29    #import "PXViewUtils.h"
30    #import "PXPaintStyler.h"
31
32    #import "PXStylingMacros.h"
33
34
35    @implementation PXUIWindow
36
37    + (void)load
38    {
39        [UIView registerDynamicSubclass:self withElementName:@"window"];
40    }
41
42    - (NSArray *)viewStylers
43    {
44        static __strong NSArray *stylers = nil;
45        static dispatch_once_t onceToken;
46
47        dispatch_once(&onceToken, ^{
48            stylers = @[
49                PXPaintStyler.sharedInstanceForTintColor,
50            ];
51
52        });
53
54        return stylers;
55    }
56
57    - (NSDictionary *)viewStylersByProperty
58    {
59        static NSDictionary *map = nil;
60        static dispatch_once_t onceToken;
```

```
61
62          dispatch_once(&onceToken, ^{
63              map = [PXStyleUtils viewStylerPropertyMap-
    ForStyleable:self];
64          });
65
66          return map;
67      }
68
        // Styling
        PXSTYLE_VIEW_UPDATER
```

This code performs two actions: it registers this particular view class for dynamic subclassing once this view becomes visible and it registers the name in which the user will present it in CSS, in this case window. In CSS, this view could then be accessed as follows:

window {
  background-color: yellow;
}

Additionally, the user may give this window an alternate name of their choosing by setting a styleId or a styleClass property directly on the view.

Dynamic Subclassing

In the main handler for all views, when a new view is presented to the user, it is first checked to see if it has been registered, and if so, will be dynamically subclassed. The following code performs this check:

```
// Perform styling operations
//
// Style the control
if (mode == PXStylingNormal)
{
    // Grabbing PX's subclass of this instance
    Class c = SubclassForViewWithClass(self, nil);
    //NSLog(@"% @ : %@ -> %@", [self class], [[self class]
superclass], c);
    // We are subclassing 'self with the PX class 'c' we found
above
        [c subclassInstance:self];
```

In the last line from the above snippet, the primary subclassing code is called. Below is the code that performs the actual subclassing of the view by creating a new class, copying the methods from the PX class into it, then reassigning this class as the new parent of the original class:

```
// object is the instance of a UIView that we need to 'subclass' (e.g.
UIButton)
// 'self' here is PX class (e.g. PXUIButton)
+ (void)subclassInstance:(id)object
{
    // Safety check for nil
    if (object == nil)
    {
      return;
    }
    // Grab the object's class (??? why 'superclass')
    Class superClass = object_getClass(object);
    // Return if we have already dynamically subclassed this class (by
checking for our pxClass method)
    if (class_getInstanceMethod(superClass, @selector(pxClass)) !=
NULL) {
      return;
    }
    // 'self' is a PX class, so we're checking that the object passed in is
not
a PX class
        if (![object isKindOfClass:[self superclass]]) {
            NSAssert(NO, @"Class %@ doesn't fit for subclassing.",
[superClass description]);
            return;
        }
        // creating the new classname by prefixing with the PX class name
        const char *className = [[NSString
stringWithFormat:@"%@_%@", [self description], [superClass
description]] UTF8String];
        // Check to see if the new PX class as already been created
        Class newClass = objc_getClass(className);
        // If the class hasn't been created before, let's do so now
        if (newClass == nil)
        {
            // The number of bytes to allocate for indexed ivars at the end of
the
class and metaclass objects
            size_t extraSize = 64;
            // Create the new class
            newClass = objc_allocateClassPair(superClass, className,
extraSize);
            // Copy all of the methods from the PX class over to the newly
created 'newClass'
            unsigned int mcount = 0;
            Method *methods = class_copyMethodList(self, &mcount);
                for (unsigned int index = 0; index < mcount; ++index)
                {
                  Method method = methods[index];
                  class_addMethod(newClass, method_getName(method),
method_getImplementation(method),
method_getTypeEncoding(method));
            }
            free(methods);
            // Add a 'class' method to new class to override the NSObject
implementation
            Method classMethod =
class_getInstanceMethod(superClass, @selector(class));
            IMP classMethodIMP =
imp_implementationWithBlock(IMPL_BLOCKCAST^(id _self, SEL
_sel){
                  return class_getSuperclass(object_getClass(_self));
            }));
class_addMethod(newClass,
method_getName(classMethod), classMethodIMP,
method_getTypeEncoding(classMethod));
            // pxClass
            IMP pxClassMethodIMP =
imp_implementationWithBlock(IMPL_BLOCK_CAST^(id _self, SEL
_sel){
                  return superClass;
            }));
            class_addMethod(newClass, @selector(pxClass),
pxClassMethodIMP, method_getTypeEncoding(classMethod));
                // respondsToSelector:
            Method respondsToSelectorMethod =
class_getInstanceMethod(superClass, @selector(respondsToSelector:));
            class_addMethod(newClass,
method_getName(respondsToSelectorMethod),
(IMP)respondsToSelectorIMP,
method_getTypeEncoding(respondsToSelectorMethod));
                // Registers a class that was allocated using objc_allocateClass-
Pair
            objc_registerClassPair(newClass);
            // Copy any extra indexed ivars (see objc_allocateClassPair)
            copyIndexedIvars(superClass, newClass, extraSize);
            // Check to make sure that the two classes (new and original) are
the
same size
            if (class_getInstanceSize(superClass) !=
class_getInstanceSize(newClass))
            {
                NSAssert(NO, @ "Class %@doesn't fit for subclassing.",
[superClass description]);
                return;
            }
        }
        else if (object_getClass(object) == newClass)
        {
            return;
```

```
    }
    object_setClass(object, newClass);
}
```

Inputting Methods

Referring back to the PXUIWindow file below, all of the methods that are defined below are copied into the newly created subclass:

This allows the methods of the user's object to be dynamically overridden without a user having to change any code, e.g., from the code above, the methods on line 41, 55, and 68 are all copied into the newly created dynamic subclass and then are made to override the user's methods.

Figure 6:
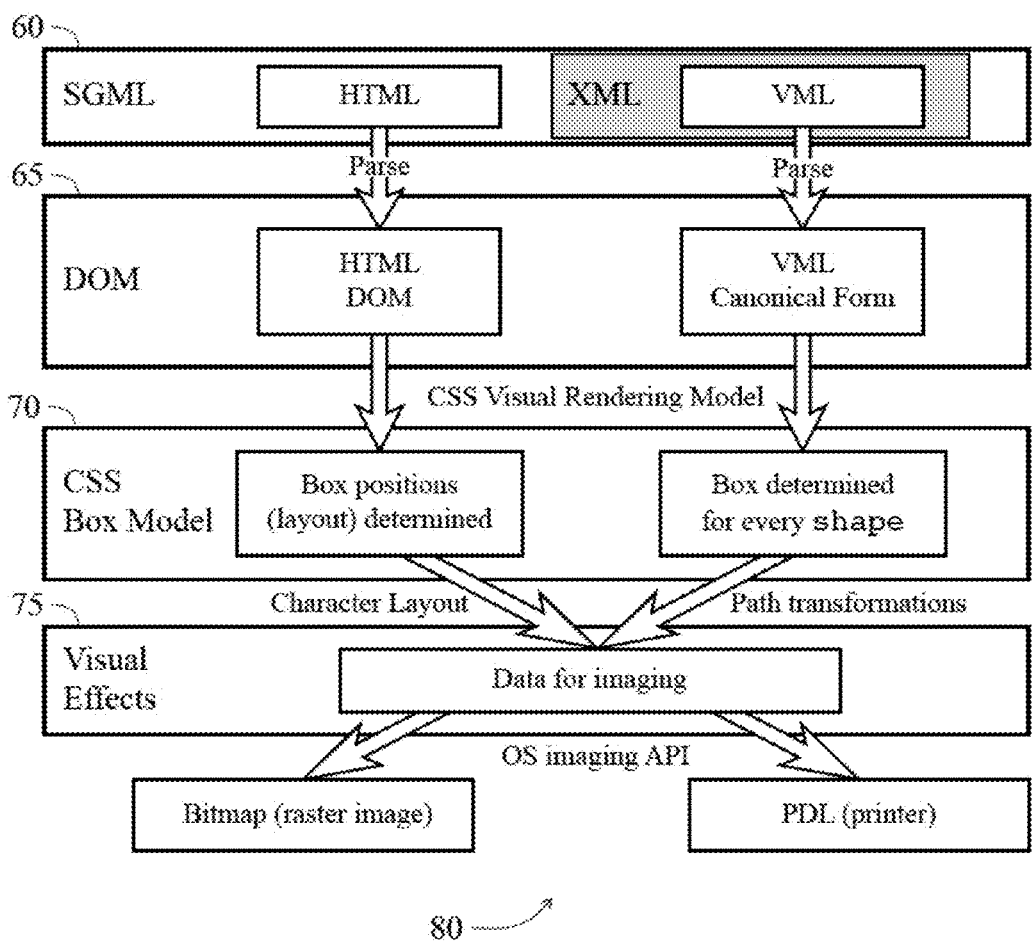
FIG. 6 is a workflow diagram of HTML/VML

CSS is a style sheet language that allows users to attach style (e.g., fonts and spacing) to structured documents (e.g., HTML documents and XML applications). FIG. 6 shows the workflow involved in rendering HTML and VML. HTML describes objects, such as paragraphs, forms or tables, and VML describes objects, such as shapes or collections of shapes (i.e., groups). Just as HTML is written using the syntax of SGML (the Standard Generalized Markup Language), VML is written using the syntax of XML (a restricted form of SGML) 60. HTML and VML use CSS to determine the layout of the objects which it contains.

The source documents, HTML and XML, are parsed to create a document tree (DOM) 65 and to identify individual elements, in hierarchic structure (HTML DOM) for HTML and in canonical form for VML.

The DOM 65 is processed for visual media using CSS visual rendering model, where each element in the DOM generates zero or more rectangular boxes 70 that are then rendered.

In HTML, the workflow generates locations and other information for sequences of characters, character layout for visual effects 75. In VML, the workflow generates locations and related information for vector paths and related objects (such as bitmaps), path transformations for visual effects 75.

Visual effects are then rendered using native operating system functionality in the way specified for HTML and VML, bitmap and PDL (page description language) 80, respectively.

Hardware

The systems and methods of the present invention can run in both a simulation environment on the users' development machines or on actual mobile device hardware (i.e. IPHONE, IPAD, etc.). In addition, any device that can run the operating systems supported (i.e. iOS, Android, MacOS) can also run the systems and methods of the present invention, which include but is not limited to, AppleTV, in-vehicle displays and devices, and other connected hardware that communicates with a host device (i.e. remote displays).

The present invention essentially provides a simple, powerful way to define the look and feel of an application. It's native, high-performance, and it helps keep developers and designers in sync. The present invention replaces hundreds of lines of native code with short, easy-to-read CSS snippets. This puts all of an application's styling in one place and makes the codebase more elegant and maintainable.

Styling apps with CSS means that designers can jump in and help make their apps pixel perfect. Just by changing a few variables, the look of an app can be quickly customized.

The present invention is powered by its own framework, for styling native components using CSS. It provides the simplicity and flexibility of CSS to style the same native iOS components that is included with XCode.

The runtime is built on a scalable vector graphics engine, a standards-based CSS styling language, and a lightweight library for interacting with iOS native controls. The present invention has tailored the familiar CSS3 language for the styling needs of native mobile components.

The framework is installed, CSS and other files are added to the app project and the classes are applied to views and controls in the app. The framework allows the native applications to be styled with stylesheets.

At application start-up, the present invention looks for an application's CSS in a file named default.css, which can be located anywhere within a project. The default.css file can include other CSS files by using @import.

CSS rules are applied using a control's element name, class, id or other attributes. This information is represented at runtime by properties on Objective-C objects.

The element name is determined by the type of control. For example, all UIButton controls have the button element name. The control descriptions lists the element name for each iOS control.

class and id are determined by the styleClass and styleId properties respectively of individual control instances. By convention, styleClass is shared by all controls with a related function or layout in the application, perhaps members within the same view. styleId is expected to be unique across the application. These conventions are not enforced by the engine of the present invention, and setting of these properties is not required unless the use wants to select controls using these properties. These properties are typically set by the application developer.

Application developers can style a specific control by setting the control's styleCSS property. This property is analogous to the style property of web CSS.

CSS Specificity determines which rules apply to controls. The present invention follows standard CSS specificity rules.

For CSS Media Queries, @media rules use CSS media queries to conditionally apply styles for different devices, screen resolutions, and orientations.

The @import rule allows importing style rules from other style sheets. The @import statement must be followed by a URL that references a file within the application bundle or the device's Documents folder.

Selectors are used to designate to which controls a given rule set applies. Simple selectors allow for the selection of controls by name, class, and id. Attribute selectors allow for controls to be selected based on the content of their attributes. Objective-C classes do not have attributes, per se, but these can be thought of as objective-C properties, in simple cases. Internally, the engine of the present invention will use Key-Value Coding (KVC) to look up a property name. Many of the controls in UI package allow settings to be associated with specific states: normal, highlighted, disabled, etc. The engine of the present invention uses pseudo-classes to indicate to which state a given rule set should apply.

Pseudo-classes are also used to match controls that meet a certain criteria. For example, it is possible to indicate that a control can match only if it is the first child of its parent, or the last child, etc.

Combinators allow the expression of complex relationships between controls. A combinator combines any combination of simple selectors and other combinators. Each combinator represents a tree relationship that must be met to select a target control.

With the present invention, high performance and a true native user experience is achieved, without any gaps. The present invention is also compatible with a variety of development frameworks and CSS tools.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method comprising:
   identifying, by a styling engine of a software application being executed by one or more processors of a computing device, a plurality of visual elements defined by a declarative markup file of the software application, wherein each visual element from the plurality of visual element is associated with a base class of an application programming interface, wherein each base class of the application programming interface includes a plurality of methods, and wherein the declarative markup file specifies a respective visual styling for each of the plurality of visual elements;
   for each visual element of the plurality of visual elements, generating, by the styling engine and based on the at least one base class associated with the visual element, a respective dynamic subclass that includes the plurality of methods of the at least one base class associated with the visual element;
   assigning, by the styling engine, the respective dynamic subclass for each visual element from the plurality of visual elements as the base class of the visual element; and
   outputting, by the computing device, for display, a graphical user interface of the software application including at least a portion of the plurality of visual elements having the visual styling specified in the declarative markup file.

2. The method of claim 1, wherein the software application is a mobile software application.

3. The method of to claim 1, wherein the software application is a web software application.

4. A device comprising:
   one or more processors; and
   a memory that stores a software application including styling engine and a declarative markup file that defines a plurality of user interface elements,
   wherein the one or more processors execute the styling engine to:
   identify the plurality of user interface elements within the declarative markup file, wherein each visual element from the plurality of visual element is associated with a base class of an application programming interface, wherein each base class of the application programming interface includes a plurality of methods, and wherein the declarative markup file specifies a respective visual styling for each of the plurality of visual elements;
   for each visual element of the plurality of visual elements, generate, based on the at least one base class associated with the visual element, a respective dynamic subclass that includes the plurality of methods of the at least one base class associated with the visual element; and
   assign the respective dynamic subclass for each visual element from the plurality of visual elements as the base class of the visual element, and
   wherein the one or more processors execute the software application to output a user interface of the software application including at least a portion of the plurality of visual elements having the visual styling specified in the declarative markup file.

5. The system of claim 4, wherein the software application is a mobile software application.

6. The system of claim 4, wherein the software application is a web software application.

7. The method of claim 1, wherein identifying the plurality of visual elements, generating the respective dynamic subclasses, and assigning the respective dynamical subclasses as the base classes are performed at runtime of the software application.

8. The method of claim 1, wherein generating the respective dynamic subclass for each visual element of the plurality of visual element comprises copying methods from the base class associated with the visual element into the dynamic subclass.

9. The method of claim 1, wherein the respective dynamic subclasses manage the static and dynamic visual styling of the corresponding visual elements.

10. The system of claim 4, wherein the one or more processors execute the styling engine to identify the plurality of visual elements, generate the respective dynamic subclasses, and assign the respective dynamical subclasses as the base classes at a runtime of the software application.

11. The system of claim 4, wherein the one or more processors execute the styling engine to generate the respective dynamic subclass for each visual element of the plurality of visual element by at least executing the styling engine to copy methods from the base class associated with the visual element into the dynamic subclass.

12. The system of claim 4, wherein the respective dynamic subclasses manage the static and dynamic visual styling of the corresponding visual elements.

* * * * *